United States Patent
Ke

(10) Patent No.: US 11,271,288 B2
(45) Date of Patent: Mar. 8, 2022

(54) METAL MIDDLE FRAME, MILLIMETER-WAVE ANTENNA STRUCTURE, AND MOBILE TERMINAL

(71) Applicant: BEIJING XIAOMI MOBILE SOFTWARE CO., LTD., Beijing (CN)

(72) Inventor: Changqing Ke, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 56 days.

(21) Appl. No.: 16/818,492

(22) Filed: Mar. 13, 2020

(65) Prior Publication Data

US 2021/0135336 A1    May 6, 2021

(30) Foreign Application Priority Data

Oct. 30, 2019   (CN) ..................... 201911043880.X

(51) Int. Cl.
| | | |
|---|---|---|
| *H04Q 1/24* | (2006.01) | |
| *H04M 1/02* | (2006.01) | |
| *H01Q 1/42* | (2006.01) | |
| *H01Q 1/24* | (2006.01) | |

(52) U.S. Cl.
CPC ............. *H01Q 1/243* (2013.01); *H01Q 1/421* (2013.01); *H04M 1/026* (2013.01)

(58) Field of Classification Search
CPC ........ H01Q 13/16; H01Q 1/243; H01Q 1/421; H01Q 21/064; H01Q 21/08; H01Q 21/28; H04M 1/026
USPC .......... 455/453, 575.1, 575.5, 575.7; 342/702
See application file for complete search history.

(56) References Cited

U.S. PATENT DOCUMENTS

| | | | | |
|---|---|---|---|---|
| 2002/0027528 | A1* | 3/2002 | Okabe ................. | H01Q 13/106 343/702 |
| 2016/0111789 | A1* | 4/2016 | Chang .................... | H01Q 1/243 343/702 |
| 2018/0041238 | A1* | 2/2018 | Jiang ................. | B29C 45/14639 |
| 2019/0214706 | A1* | 7/2019 | Kim ....................... | G06F 1/1626 |
| 2020/0044346 | A1* | 2/2020 | Gu .......................... | H01Q 5/328 |
| 2020/0295461 | A1* | 9/2020 | Luk ........................ | H01Q 9/045 |
| 2020/0358198 | A1* | 11/2020 | Hsu ........................ | H01Q 5/328 |

(Continued)

FOREIGN PATENT DOCUMENTS

| | | |
|---|---|---|
| EP | 3149805 A1 | 4/2017 |
| EP | 3293824 A1 | 3/2018 |

(Continued)

OTHER PUBLICATIONS

Extended European search report of counterpart EP application No. 20164514.0 dated Sep. 25, 2020.

*Primary Examiner* — Tan H Trinh
(74) *Attorney, Agent, or Firm* — Syncoda LLC; Feng Ma

(57) ABSTRACT

A frame body of the metal middle frame includes a first side and a second side, which are jointed at a side edge of the first side and second side; an L-shaped slit is arranged on the frame body, and includes a first slit edge and a second slit edge which are jointed at an end point of the first slit edge and the second slit edge, the first slit edge is arranged on the first side, and the second slit edge is arranged on the second side; and a millimeter-wave antenna is arranged in the L-shaped slit, and the millimeter-wave antenna is configured to perform millimeter-wave radiation through the first slit edge and the second slit edge.

20 Claims, 5 Drawing Sheets

(56) References Cited

U.S. PATENT DOCUMENTS

2020/0412015 A1* 12/2020 Zhang .................... H01Q 1/243
2021/0044003 A1* 2/2021 Ma ........................ H01Q 13/10

FOREIGN PATENT DOCUMENTS

| TW | 201401645 A | 1/2014 |
| WO | 2015180619 A1 | 12/2015 |
| WO | 2018126563 A1 | 7/2018 |

* cited by examiner

US 11,271,288 B2

METAL MIDDLE FRAME, MILLIMETER-WAVE ANTENNA STRUCTURE, AND MOBILE TERMINAL

CROSS-REFERENCE TO RELATED APPLICATION

The present application claims priority to Chinese Patent Application No. 201911043880.X filed on Oct. 30, 2019, the disclosure of which is hereby incorporated by reference in its entirety.

BACKGROUND

With the rapid development of the communications industry, wireless communications have been adopting new spectrum resources for application. Millimeter waves refer to electromagnetic waves having wavelengths from 10 millimeters to 1 millimeter, and frequencies from 10 gigahertz (GHz) to 300 GHz. Communications with the millimeter waves are referred to as millimeter-wave communications.

SUMMARY

According to an aspect of the present disclosure, a metal middle frame is provided, and a frame body of the metal middle frame includes: a first side and a second side which are joined at a side edge of the first side and second side;

an L-shaped slit is arranged on in the frame body, and the L-shaped slit includes a first slit edge and a second slit edge which are jointed at an end point of the first slit edge and the second slit edge, the first slit edge is arranged on the first side, and the second slit edge is arranged on the second side; and a millimeter-wave antenna is arranged in the L-shaped slit, and the millimeter-wave antenna is configured to perform millimeter-wave radiation through the first slit edge and the second slit edge of the L-shaped slit.

In an optional embodiment, n L-shaped slits are arranged on the frame body, the n L-shaped slits are arranged in an array, and n is a positive integer.

In an optional embodiment, the n L-shaped slits comprise n first slit edges and n second slit edges which are jointed at end points of the first slit edges and the second slit edges; and the n first slit edges are arranged in parallel on the first side, and the n second slit edges are arranged in parallel on the second side.

In an optional embodiment, the metal middle frame further includes: a third side jointed with the first side and second side, wherein n L-shaped slits are arranged on the frame body, n being a positive integer; and p L-shaped slits are arranged at a joint of the first side and the second side, q L-shaped slits are arranged at a joint of the second side and the third side, and k L-shaped slits are arranged at a joint of the first side and the third side, wherein p, q and k are all positive integers, and the sum of p, q and k is n.

In an optional embodiment, the metal middle frame further includes a fourth side which is jointed with the second side but not jointed with the first side, wherein n L-shaped slits are arranged on the frame body, n being a positive integer; and f L-shaped slits are arranged at a joint of the first side and the second side, and g L-shaped slits are arranged at a joint of the second side and the fourth side, wherein f and g are both positive integers, and the sum of f and g is n.

In an optional embodiment, a metal strip is arranged in the metal middle frame at a preset distance from the L-shaped slit, and the metal strip is perpendicular to the first slit edge and the second slit edge of the L-shaped slit; and the millimeter-wave antenna is fed with power by being coupled with the metal strip.

In an optional embodiment, a feeding point is welded on the L-shaped slit and is configured to feed power to the millimeter-wave antenna.

In an optional embodiment, an electrical connection metal sheet is connected to the L-shaped slit, and the millimeter-wave antenna is fed with power by being in hard contact with the electrical connection metal sheet.

In an optional embodiment, the L-shaped slit is a slot filled with an insulating material;

or, the L-shaped slit is a hollow slot;

or, the L-shaped slit is a slot covered with a net structure.

According to another aspect of the present disclosure, a millimeter-wave antenna structure is provided which includes the metal middle frame provided by the embodiment of the present disclosure and a millimeter-wave antenna.

According to another aspect of the present disclosure, a mobile terminal is provided which includes the metal middle frame provided by the embodiment of the present disclosure and a millimeter-wave antenna.

BRIEF DESCRIPTION OF THE DRAWINGS

The accompanying drawings; which are incorporated in and constitute a part of this disclosure, illustrate embodiments consistent with the present disclosure and, together with the description, serve to explain the principles of the present disclosure.

DETAILED DESCRIPTION

Descriptions will now be made in detail with respect to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiment do not represent all implementations consistent with the present disclosure. Instead, they are merely examples of apparatuses and methods consistent with aspects related to the disclosure as recited in the appended claims.

In a typical mobile terminal, in the case that a middle frame of the terminal is a metal middle frame, the metal middle frame shields the millimeter wave radiation. Thus, a millimeter-wave module is arranged on the metal middle frame to perform the radiation of the millimeter-wave.

However, as the millimeter-wave module can only cover one direction, and thus cannot achieve multi-directional coverage. As a result, the millimeter-wave radiation cannot meet requirements for communications.

Figure 1:
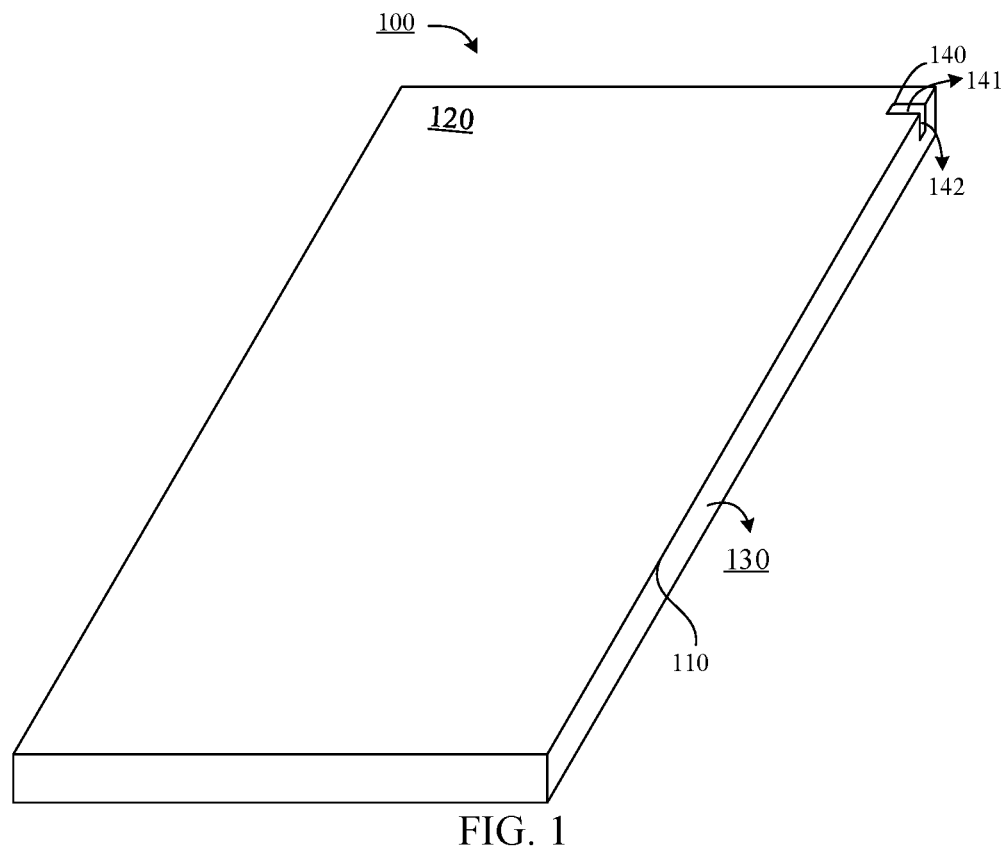
FIG. 1 is a schematic diagram of a metal middle frame 100 provided by some embodiments of the present disclosure.

FIG. 1 is a schematic diagram of a metal middle frame 100 provided by some embodiments of the present disclosure. The metal middle frame 100 is configured to arrange a millimeter-wave antenna. As shown in FIG. 1, a frame body of the metal middle frame 100 includes: a first side 120 and a second side 130 which are joined at a side edge 110 thereof.

An L-shaped slit 140 is arranged in the metal middle frame 100, and includes a first slit edge 141 and a second slit edge 142 which are joined at an end point thereof. The first slit edge 141 is arranged on the first side 120, and the second slit edge 142 is arranged on the second side 130. In some embodiments, a millimeter-wave antenna is arranged in the L-shaped slit, and is configured to perform millimeter-wave radiation through the first slit edge 141 and the second slit edge 142 of the L-shaped slit 140.

In some embodiments, in FIG. 1, an example in which the first side 120 and the second side 130 are joined at a longitudinal side edge 110 thereof is taken as an example for description. The first side 120 and the second side 130 may also be joined at a transverse side edge thereof, which is not limited in the embodiment of the present disclosure. According to the structure of a terminal, it can be known that the middle frame of the terminal generally includes eight side edges. Thus, the first side 120 and the second side 130 may be two sides jointed at any one of the eight side edges thereof.

In some embodiments, when the first side 120 and the second side 130 are jointed at the longitudinal side edge thereof, the first slit edge 141 and the second slit edge 142 of the L-shaped slit 140 are perpendicular to the longitudinal side edge; and the first slit edge 141 is parallel to the transverse side edge of the terminal on the first side 120, and the second slit edge 142 is parallel to the transverse side edge of the terminal on the second side 130. When the first side 120 and the second side 130 are jointed at the transverse side edge thereof, the first slit edge 141 and the second slit edge 142 of the L-shaped slit 140 are perpendicular to the transverse side edge; and the first slit edge 141 is parallel to the longitudinal side edge of the terminal on the first side 120, and the second slit edge 142 is parallel to the longitudinal side edge of the terminal on the second side 130.

In some embodiments, the first slit edge 141 of the L-shaped slit 140 may be set at any angle on the first side 120; and the second slit edge 142 may be set at any angle on the second side 130, which are not limited in the embodiment of the present disclosure.

In some embodiments, the L-shaped slit 140 is a slot filled with an insulating material, such as glass or plastic. Or the L-shaped slit 140 is a hollow slot. Or, the L-shaped slit 140 is a slot covered with a net structure. For example, when the L-shaped slit 140 is located at a position of a microphone, an earpiece, or an amplifier, the L-shaped slit 140 is covered with the net structure.

In some embodiments, the millimeter-wave antenna at the L-shaped slit 140 needs to be fed with power, and a feeding manner of the millimeter-wave antenna includes at least one of the following manners.

First, a metal strip is arranged in the metal middle frame 100 at a preset distance from the L-shaped slit 140, and is perpendicular to the first and second slit edges of the L-shaped slit; and the millimeter-wave antenna is fed with power by being coupled with the metal strip.

Figure 2:
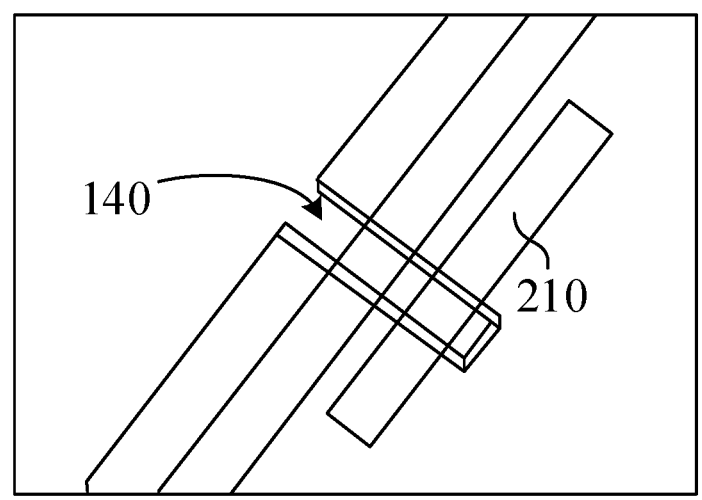
FIG. 2 is a schematic diagram of a metal strip for supplying power to a millimeter-wave antenna provided by some embodiments of the present disclosure.

Schematically, referring to FIG. 2, the metal strip 210 is arranged at the preset distance from the L-shaped slit 140, and is perpendicular to the L-shaped slit. The millimeter-wave antenna corresponding to the L-shaped slit 140 is fed with power by being coupled with the metal strip 210.

Second, a feeding point is welded on the L-shaped slit, and the millimeter-wave antenna is fed with power through the feeding point.

Third, an electrical connection metal sheet is connected to the L-shaped slit, and the millimeter-wave antenna is fed with power by being in hard contact with the electrical connection metal sheet.

In some embodiments, the electrical connection metal sheet may be implemented in the form of an elastic sheet, or may be implemented in other forms, which is not limited in the embodiment of the present disclosure.

In some embodiments, the millimeter-wave antenna may be arranged at the L-shaped slit through laser direct structuring (LDS) technology, or through a flexible plate such as a liquid crystal polymer (LCP) film, a flexible printed circuit (FPC), or a modified PI (MPI).

As such, according to the metal middle frame provided by the embodiment of the present disclosure, by arranging the L-shaped slit on the first side and the second side, and radiating a millimeter wave through the first and second slit edges of the L-shaped slit, a single millimeter-wave module can perform millimeter-wave radiation in a direction corresponding to the first side and in a direction corresponding to the second side, and thus covers the two directions simultaneously, so that a coverage range of the millimeter-wave antenna is widened and a millimeter-wave radiation property is improved.

In some embodiments, a plurality of L-shaped slits may be further arranged in the metal middle frame 100. Schematically, n L-shaped slits are arranged in the metal middle frame 100, wherein n is a positive integer. The n L-shaped slits may be arranged between the same two sides and are arranged in an array, or may be arranged between different sides, which is not limited in the embodiment of the present disclosure.

Illustratively, the arrangement manner of the n L-shaped slits includes any one of the following manners.

First, the n L-shaped slits are arranged in an array on the frame body.

In some embodiments, the n L-shaped slits include n first slit edges and n second slit edges which are jointed at end points thereof; the n first slit edges are arranged in parallel on the first side; and the n second slit edges are arranged in parallel on the second side.

Figure 3:
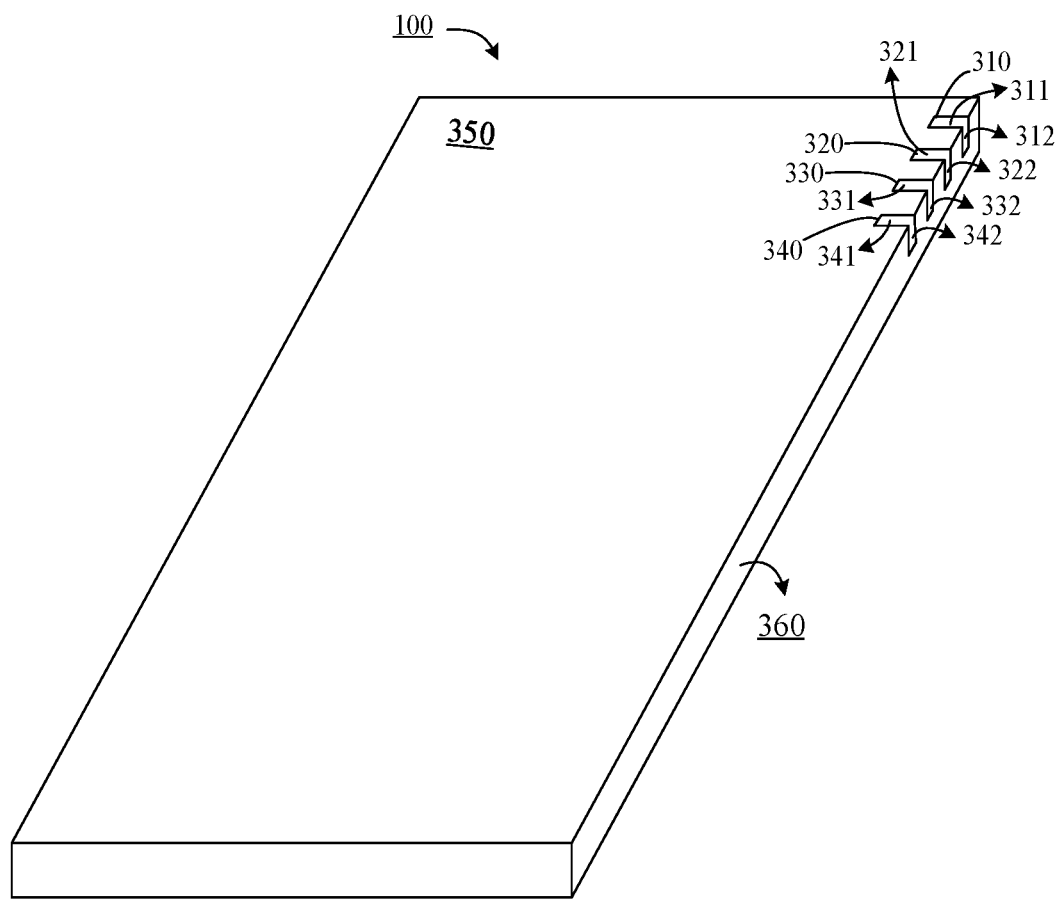
FIG. 3 is a schematic diagram of an arrangement manner of L-shaped slits on a frame body provided by some embodiments of the present disclosure.

Schematically, referring to FIG. 3 which is a schematic diagram of an array arrangement manner of L-shaped slits provided by some embodiments of the present disclosure, an example in which the frame body includes four L-shaped slits is taken as an example for description. As shown in FIG.

3, an L-shaped slit 310, an L-shaped slit 320, an L-shaped slit 330 and an L-shaped slit 340 are arranged in the frame body of the metal middle frame 100.

The L-shaped slit 310 includes a first slit edge 311 and a second slit edge 312 which are jointed at an end point thereof. The first slit edge 311 is arranged on the first side 350, and the second slit edge 312 is arranged on the second side 360. In some embodiments, a millimeter-wave antenna is arranged in the L-shaped slit 310, and is configured to perform millimeter-wave radiation through the first slit edge 311 and the second slit edge 312 of the L-shaped slit 310.

The L-shaped slit 320 includes a first slit edge 321 and a second slit edge 322 which are jointed at an end point thereof. The first slit edge 321 is arranged on the first side 350, and the second slit edge 322 is arranged on the second side 360. In some embodiments, a millimeter-wave antenna is arranged in the L-shaped slit 320, and is configured to perform millimeter-wave radiation through the first slit edge 321 and the second slit edge 322 of the L-shaped slit 320.

The L-shaped slit 330 includes a first slit edge 331 and a second slit edge 332 which are jointed at an end point thereof. The first slit edge 331 is arranged on the first side 350, and the second slit edge 332 is arranged on the second side 360. In some embodiments, a millimeter-wave antenna is arranged in the L-shaped slit 330, and is configured to perform millimeter-wave radiation through the first slit edge 331 and the second slit edge 332 of the L-shaped slit 330.

The L-shaped slit 340 includes a first slit edge 341 and a second slit edge 342 which are jointed at an end point thereof. The first slit edge 341 is arranged on the first side 350, and the second slit edge 342 is arranged on the second side 360. In some embodiments, a millimeter-wave antenna is arranged in the L-shaped slit 340, and is configured to perform millimeter-wave radiation through the first slit edge 341 and the second slit edge 342 of the L-shaped slit 340.

In some embodiments, the first slit edges 311, 321, 331 and 341 are arranged in parallel on the first side 350; and the second slit edges 312, 322, 332 and 342 are arranged in parallel on the second side 360. That is, the above L-shaped slits 310, 320, 330 and 340 are arranged in an array on the first side 350 and the second side 360.

In some embodiments, each of the n L-shaped slits may correspond to one radio frequency front end. Or, a plurality of L-shaped slits may correspond to one radio frequency front end which is controlled by a switch.

Second, the n L-shaped slits are distributed on the first side and the second side, on the second side and a third side, and on the first side and the third side, of the frame body, respectively.

In some embodiments, the frame body of the metal middle frame 100 further includes a third side jointed with the first side and the second side; p L-shaped slits are arranged at a joint of the first side and the second side; q L-shaped slits are arranged at a joint of the second side and the third side; and k L-shaped slits are arranged at a joint of the first side and the third side, wherein p, q and k are all positive integers, and the sum of p, q and k is n. In some embodiments, one or two of p, q and k may be endowed with a value of 0.

Figure 4:
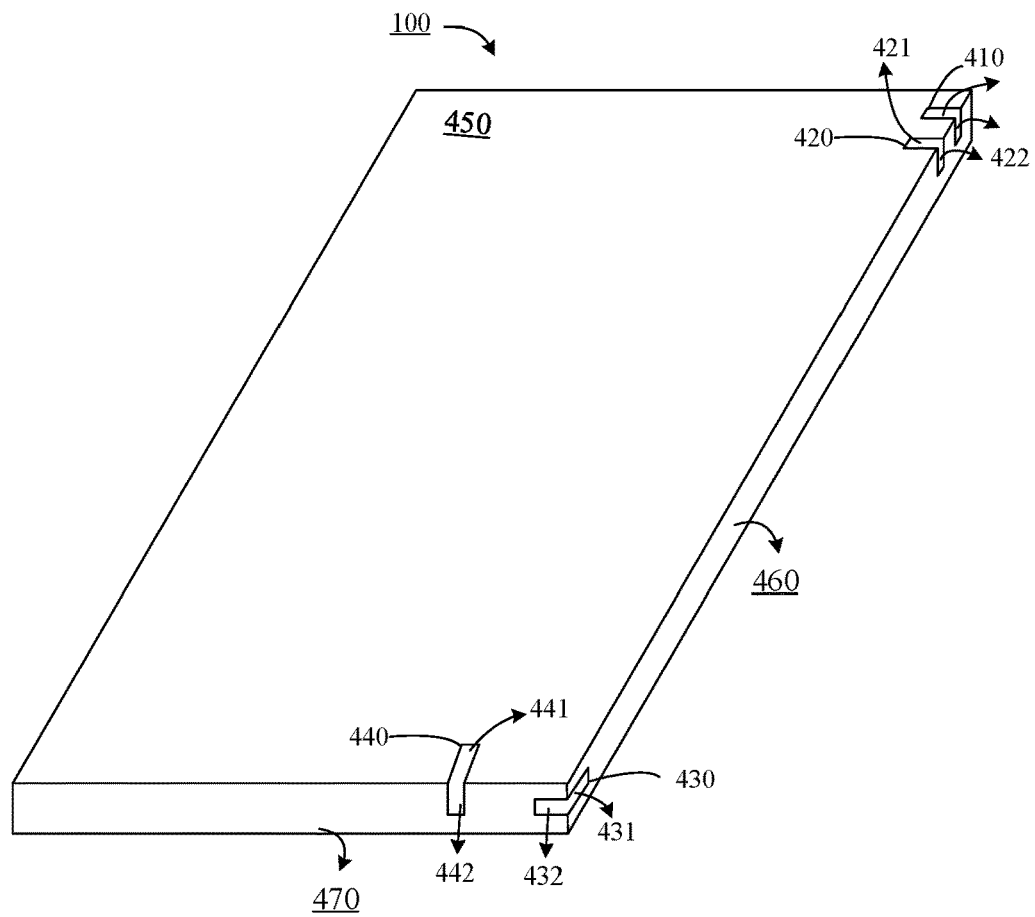
FIG. 4 is a schematic diagram of an arrangement manner of L-shaped slits on the frame body provided by another exemplary embodiment of the present disclosure.

Schematically, referring to FIG. 4 which is a schematic diagram of an arrangement manner of L-shaped slits provided by some embodiments of the present disclosure, an example in which the frame body includes four L-shaped slits is taken as an example for description. As shown in FIG. 4, an L-shaped slit 410, an L-shaped slit 420, an L-shaped slit 430 and an L-shaped slit 440 are provided in the frame body of the metal middle frame 100.

The L-shaped slit 410 includes a first slit edge 411 and a second slit edge 412 which are jointed at an end point thereof. The first slit edge 411 is arranged on the first side 450, and the second slit edge 412 is arranged on the second side 460. In some embodiments, a millimeter-wave antenna is arranged in the L-shaped slit 410, and is configured to perform millimeter-wave radiation through the first slit edge 411 and the second slit edge 412 of the L-shaped slit 410.

The L-shaped slit 420 includes a first slit edge 421 and a second slit edge 422 which are jointed at an end point thereof. The first slit edge 421 is arranged on the first side 450, and the second slit edge 422 is arranged on the second side 460. In some embodiments, a millimeter-wave antenna is arranged in the L-shaped slit 420, and is configured to perform millimeter-wave radiation through the first slit edge 421 and the second slit edge 422 of the L-shaped slit 420.

The L-shaped slit 430 includes a first slit edge 431 and a second slit edge 432 which are jointed at an end point thereof. The first slit edge 431 is arranged on the second side 460, and the second slit edge 432 is arranged on the third side 470. In some embodiments, a millimeter-wave antenna is arranged in the L-shaped slit 430, and is configured to perform millimeter-wave radiation through the first slit edge 431 and the second slit edge 432 of the L-shaped slit 430.

The L-shaped slit 440 includes a first slit edge 441 and a second slit edge 442 which are jointed at an end point thereof. The first slit edge 441 is arranged on the first side 450, and the second slit edge 442 is arranged on the third side 470. In some embodiments, a millimeter-wave antenna is arranged in the L-shaped slit 440, and is configured to perform millimeter-wave radiation through the first slit edge 441 and the second slit edge 442 of the L-shaped slit 440.

In summary, according to the metal middle frame provided by the embodiment of the present disclosure, by arranging the L-shaped slits on the first side and the second side, on the second side and the third side, and on the first side and the third side, and by radiating a millimeter wave through the first and second slit edges of the L-shaped slits, that is, a millimeter-wave module can perform millimeter-wave radiation in directions respectively corresponding to the first, second and third sides, and thus covers the three directions simultaneously, so that a coverage range of the millimeter-wave antenna is widened and a millimeter-wave radiation property is enhanced.

Third, the n L-shaped slits are distributed on the first side and the second side, and on the second side and a fourth side, on the frame body, respectively.

In some embodiments, the frame body of the metal middle frame 100 further includes the fourth side which is jointed with the second side but is not jointed with the first side; f L-shaped slits are arranged at a joint of the first side and the second side; and g L-shaped slits are arranged at a joint of the second side and the fourth side, wherein f and g are both positive integers, and the sum of f and g is n. In some embodiments, one of f and g may be endowed with a value of 0.

Figure 5:
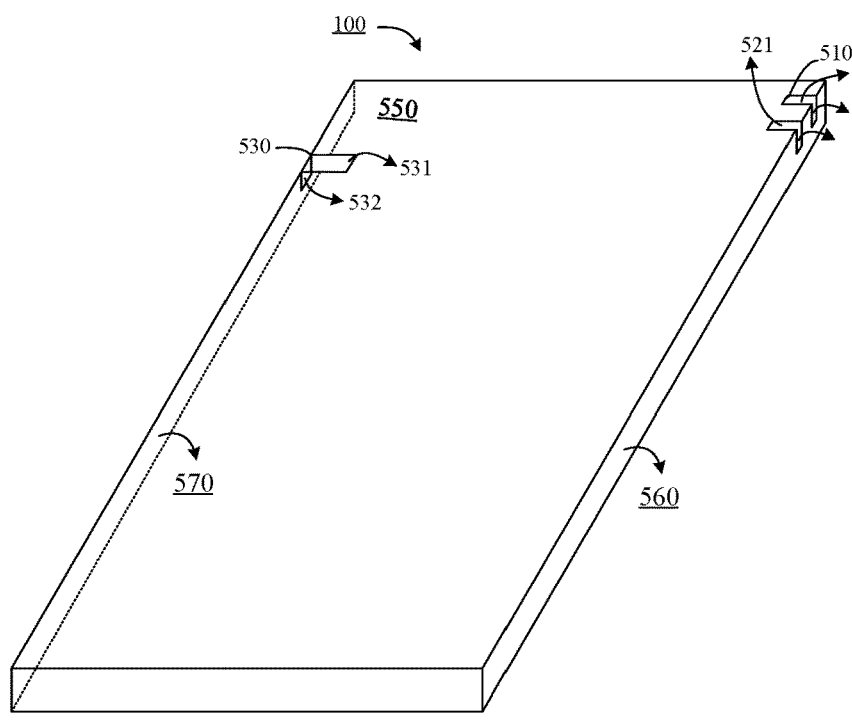
FIG. 5 is a schematic diagram of an arrangement manner of L-shaped slits on the frame body provided by another exemplary embodiment of the present disclosure.

Schematically, referring to FIG. 5 which is a schematic diagram of an arrangement manner of L-shaped slits provided by some embodiments of the present disclosure, an example in which the frame body includes three L-shaped slits is taken as an example for description. As shown in FIG. 5, an L-shaped slit 510, an L-shaped slit 520, and an L-shaped slit 530 are arranged in the frame body of the metal middle frame 100.

The L-shaped slit 510 includes a first slit edge 511 and a second slit edge 512 which are jointed at an end point thereof. The first slit edge 511 is arranged on the first side 560, and the second slit edge 512 is arranged on the second side 550. In some embodiments, a millimeter-wave antenna is arranged in the L-shaped slit 510, and is configured to perform millimeter-wave radiation through the first slit edge 511 and the second slit edge 512 of the L-shaped slit 510.

The L-shaped slit 520 includes a first slit edge 521 and a second slit edge 522 which are jointed at an end point thereof. The first slit edge 521 is arranged on the first side 560, and the second slit edge 522 is arranged on the second side 550. In some embodiments, a millimeter-wave antenna is arranged in the L-shaped slit 520, and is configured to perform millimeter-wave radiation through the first slit edge 521 and the second slit edge 522 of the L-shaped slit 520.

The L-shaped slit 530 includes a first slit edge 531 and a second slit edge 532 which are jointed at an end point thereof. The first slit edge 531 is arranged on the second side 550, and the second slit edge 532 is arranged on the fourth side 570. In some embodiments, a millimeter-wave antenna is arranged in the L-shaped slit 530, and is configured to perform millimeter-wave radiation through the first slit edge 531 and the second slit edge 532 of the L-shaped slit 530.

Figure 6:
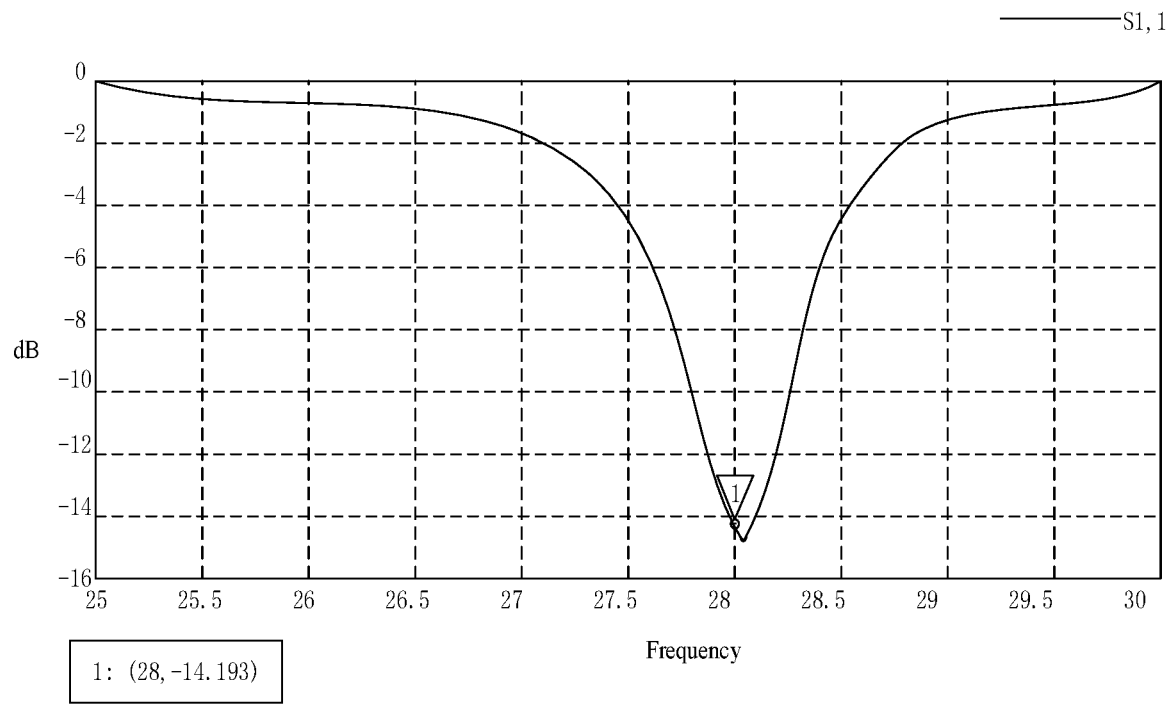
FIG. 6 is a schematic diagram of a radiation effect of a millimeter-wave antenna provided by some embodiments of the present disclosure.

Schematically, FIG. 6 shows a schematic diagram of S-11 parameters provided by some embodiments of the present disclosure. As shown in FIG. 6, after the L-shaped slit is arranged in the above manner, when the frequency of the millimeter-wave antenna of the terminal reaches 28 GHz, the value of dB reaches −14.193, which meets the radio frequency requirements on the millimeter waves.

Figure 7:
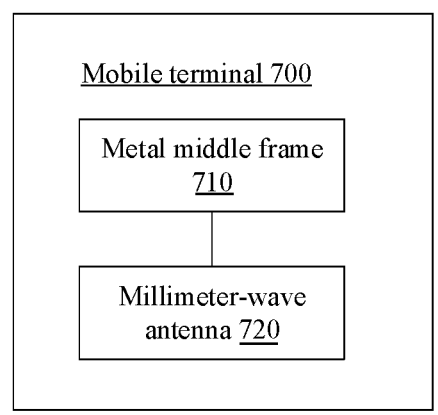
FIG. 7 is a structural block diagram of a terminal provided by some embodiments of the present disclosure.

FIG. 7 is a structural block diagram of a mobile terminal provided by some embodiments of the present disclosure. As shown in FIG. 7, the mobile terminal 700 includes a metal middle frame 710 and a millimeter-wave antenna 720.

The mobile terminal 700 is a terminal capable of positioning. In some embodiments, the mobile terminal 700 may be any one of a mobile phone, a tablet PC, a portable notebook computer, and a vehicle-mounted navigation system.

The metal middle frame 710 is the metal middle frame described in any one of FIGS. 1 to 3. The millimeter-wave antenna 720 is configured to perform millimeter-wave radiation, and is arranged on the metal middle frame 710. In some embodiments, the terminal 700 further includes the following.

A memory stores at least one instruction, at least one code, a code set, or an instruction set, wherein the at least one instruction, the at least one code, the code set or the instruction set is loaded by a processor to execute all functions to be realized by the mobile terminal 700.

A processor is configured to load the at least one instruction, the at least one code, the code set or the instruction set stored in the above memory to execute the all functions to be realized by the mobile terminal 700. In some embodiments, the processor may be at least one of a single-core processor, a multi-core processor, and an embedded chip.

Figure 8:
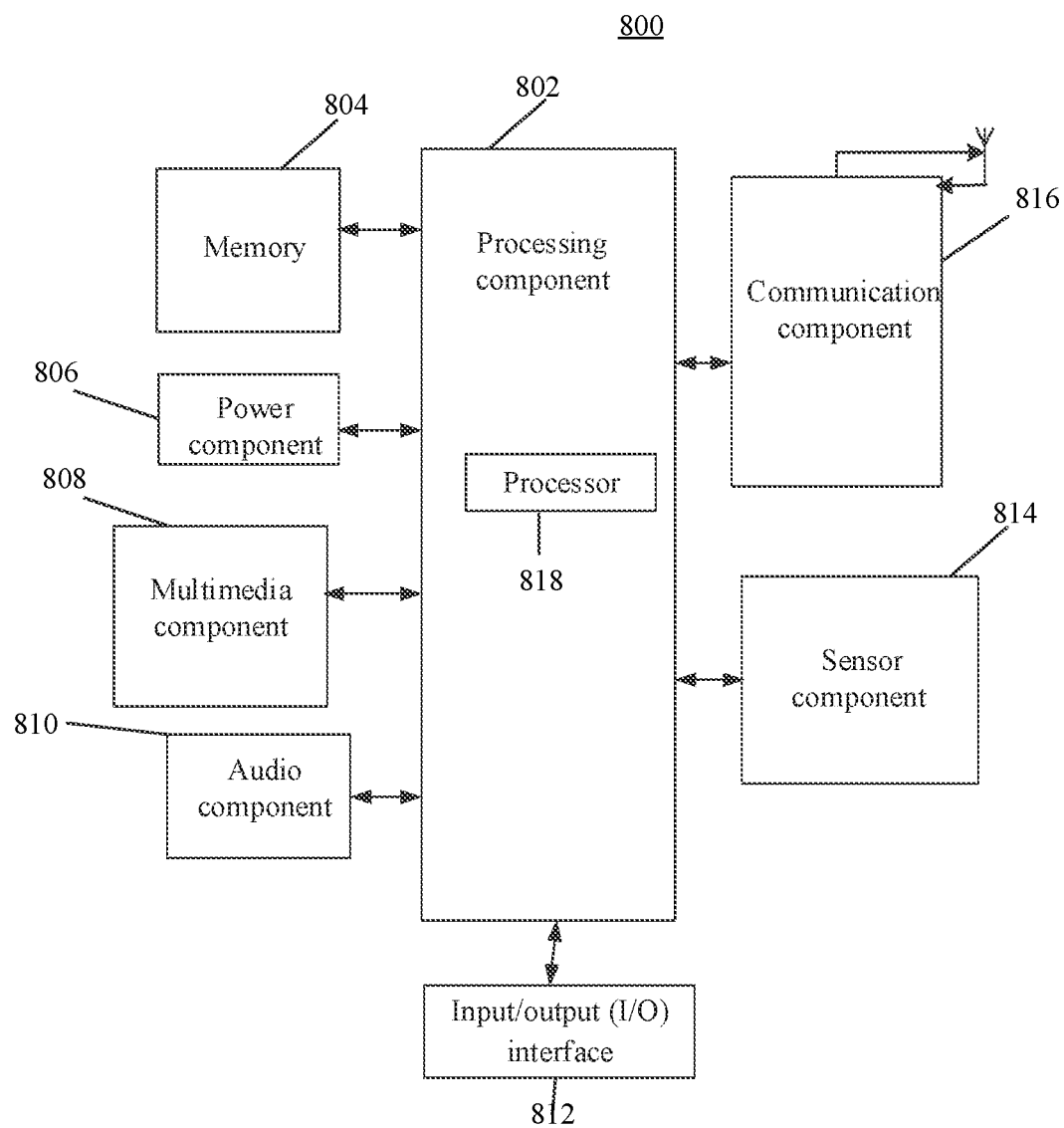
FIG. 8 is a structural block diagram of a terminal provided by another exemplary embodiment of the present disclosure.

FIG. 8 is a block diagram of a computer device 800 according to some embodiments of the present disclosure. For example, the computer device 800 may be a terminal described as above. For example, the computer device may be a mobile phone, a tablet computer, an electronic book reader, a multimedia player, a personal computer (PC), a wearable device or other electronic devices.

The mobile terminal 800 can have a metal back cover comprising the middle frame where the millimeter-wave antenna is arranged.

Referring to FIG. 8, the computer device 800 may include one or more of the following components: a processing component 802, a memory 804, a power component 806, a multimedia component 808, an audio component 810, an input/output (110) interface 812, a sensor component 814, and a communication component 816.

The processing component 802 typically controls overall operations of the computer device 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the computer device 800. Examples of such data include instructions for any applications or methods operated on the computer device 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the computer device 800. The power component 806 may include a power management system, one or more power sources, and any other components associated with the generation, management, and distribution of power in the computer device 800.

The multimedia component 808 includes a screen providing an output interface between the terminal device 800 and the user. In some embodiments, the screen may include a liquid crystal display (LCD) and a touch panel (TP). In some embodiments, the screen may include an organic light-emitting diode (OLED) display or other types of displays.

If the screen includes the touch panel, the screen may be implemented as a touch screen to receive input signals from the user. The touch panel includes one or more touch sensors to sense touches, slips, and gestures on the touch panel. The touch sensors may not only sense a boundary of a touch or slip action, but also sense a period of time and a pressure associated with the touch or slip action. In some embodiments, the multimedia component 808 includes a front camera and/or a rear camera. The front camera and the rear camera may receive an external multimedia datum while the device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the computer device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The 10 interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the computer device 800. For instance, the sensor component 814 may detect an open/closed status of the computer device 800, relative positioning of components, e.g., the display and the keypad, of the computer device 800, a change in position of the computer device 800 or a component of the computer device 800, a presence or absence of user contact with the computer device 800, an orientation or an acceleration/deceleration of the computer device 800, and a change in temperature of the computer device 800. The sensor component 814 may include a proximity sensor configured to detect the presence of nearby objects without any physical contact. The sensor component 814 may also include a light sensor, such as a complementary metal oxide semiconductor (CMOS) or charge-coupled device (CCD) image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the computer device 800 and other devices. The computer device 800 can access a wireless network based on a communication standard, such as WiFi, 2G, or 3G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWE) technology, a Bluetooth (BT) technology, and other technologies.

In exemplary embodiments, the computer device 800 may be implemented with one or more application specific integrated circuits (ASICs), digital signal processors (DSPs), digital signal processing devices DSPDs), programmable logic devices (PLDs), field programmable gate arrays (FPGAs), controllers, micro-controllers, microprocessors, or other electronic components.

In exemplary embodiments, there is also provided a non-transitory computer-readable storage medium including instructions, such as the memory 804 including instructions. These instructions may be loaded and executed by the processor 820 in the computer device 800 for controlling a millimeter wave antenna. For example, the non-transitory computer-readable storage medium may be a ROM, a RAM, a CD-ROM, a magnetic tape, a floppy disc, an optical data storage device, or the like.

Various embodiments of the present disclosure can have one or more of the following advantages.

By arranging the L-shaped slit on the first side and the second side, and radiating a millimeter wave through the first and second slit edges of the L-shaped slit, a single millimeter-wave module can perform millimeter-wave radiation in a direction corresponding to the first side and in a direction corresponding to the second side, and thus covers the two directions simultaneously, so that a coverage range of the millimeter-wave antenna is widened and a millimeter-wave radiation property is improved.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

Other implementation solutions of the present disclosure will be apparent to those skilled in the art from consideration of the specification and practice of the embodiments of the present disclosure. This disclosure is intended to cover any variations, uses, or adaptations of the embodiments of the present disclosure following the general principles thereof and including such departures from the embodiments of the present disclosure as come within known or customary practice in the art. It is intended that the specification and examples be considered as exemplary only, with a true scope and spirit of the embodiments of the present disclosure being indicated by the following claims.

In the embodiments of the present disclosure, the feed object of each feed port is changed through a shift function of the radio frequency switch, thereby forming different antenna arrays in different states and extending coverage of the antenna array. Compared with the technical solution that each antenna array includes fixed array elements in the related art, an arraying manner for the antenna array in the embodiment of the present disclosure is more flexible.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

In the description of the present disclosure, the terms "some embodiments," "example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features can be described above as acting in certain combinations and even initially claimed as such, one or more features from a claimed combination can in some cases be excised from the combination, and the claimed combination can be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A metal middle frame for arranging a millimeter-wave antenna, wherein
   a frame body of the metal middle frame comprises a first side and a second side which are joined at a side edge of the first side and the second side;
   an L-shaped slit is arranged on the frame body, and the L-shaped slit comprises a first slit edge and a second slit edge which are jointed at an end point of the first slit edge and the second slit edge, the first slit edge is arranged on the first side, and the second slit edge is arranged on the second side;
   a millimeter-wave antenna is arranged in the L-shaped slit, and the millimeter-wave antenna is configured to perform millimeter-wave radiation through the first slit edge and the second slit edge of the L-shaped slit,
   a metal strip is arranged in the metal middle frame at a preset distance from the L-shaped slit, and the metal strip is perpendicular to the first slit edge and the second slit edge of the L-shaped slit; and
   the millimeter-wave antenna is fed with power by being coupled with the metal strip.

2. The metal middle frame according to claim 1, wherein n L-shaped slits are arranged on the frame body, the n L-shaped slits are arranged in an array, and n is a positive integer.

3. The metal middle frame according to claim 2, wherein the n L-shaped slits comprise n first slit edges and n second slit edges which are jointed at end points of the first slit edges and the second slit edges; and
   the n first slit edges are arranged in parallel on the first side, and the n second slit edges are arranged in parallel on the second side.

4. The metal middle frame according to claim 1, further comprising: a third side jointed with the first side and the second side, wherein
   n L-shaped slits are arranged on the frame body, n being a positive integer; and
   p L-shaped slits are arranged at a joint of the first side and the second side, q L-shaped slits are arranged at a joint of the second side and the third side, and k L-shaped slits are arranged at a joint of the first side and the third side, wherein p, q and k are all positive integers, and the sum of p, q and k is n.

5. The metal middle frame according to claim 1, further comprising a fourth side which is jointed with the second side but not jointed with the first side, wherein
   n L-shaped slits are arranged on the frame body, n being a positive integer; and
   f L-shaped slits are arranged at a joint of the first side and the second side, and g L-shaped slits are arranged at a joint of the second side and the fourth side, wherein f and g are both positive integers, and the sum of f and g is n.

6. The metal middle frame according to claim 1, wherein a feeding point is welded on the L-shaped slit and is configured to feed power to the millimeter-wave antenna.

7. The metal middle frame according to claim 1, wherein an electrical connection metal sheet is connected to the L-shaped slit, and the millimeter-wave antenna is fed with power by being in hard contact with the electrical connection metal sheet.

8. The metal middle frame according to claim 1, wherein the L-shaped slit is a slot filled with an insulating material; or,
   the L-shaped slit is a hollow slot;
   or,
   the L-shaped slit is a slot covered with a net structure.

9. A millimeter-wave antenna structure, comprising a metal middle frame, and a millimeter-wave antenna, wherein
   a frame body of the metal middle frame comprises a first side and a second side which are joined at a side edge of the first side and the second side;
   an L-shaped slit is arranged on the frame body, and the L-shaped slit comprises a first slit edge and a second slit edge which are jointed at an end point of the first slit edge and the second slit edge, the first slit edge is arranged on the first side, and the second slit edge is arranged on the second side;
   a millimeter-wave antenna is arranged in the L-shaped slit, and the millimeter-wave antenna is configured to perform millimeter-wave radiation through the first slit edge and the second slit edge of the L-shaped slit;
   a metal strip is arranged in the metal middle frame at a preset distance from the L-shaped slit, and the metal strip is perpendicular to the first slit edge and the second slit edge of the L-shaped slit; and
   the millimeter-wave antenna is fed with power by being coupled with the metal strip.

10. The millimeter-wave antenna structure according to claim 9, wherein
    n L-shaped slits are arranged on the frame body, the n L-shaped slits are arranged in an array, and n is a positive integer.

11. The millimeter-wave antenna structure according to claim 10, wherein
    the n L-shaped slits comprise n first slit edges and n second slit edges which are jointed at end points of the first slit edges and the second slit edges; and
    the n first slit edges are arranged in parallel on the first side, and the n second slit edges are arranged in parallel on the second side.

12. A mobile terminal, comprising a metal middle frame and a millimeter-wave antenna,
    wherein
    a frame body of the metal middle frame comprises a first side and a second side which are joined at a side edge of the first side and the second side;
    an L-shaped slit is arranged on the frame body, and the L-shaped slit comprises a first slit edge and a second slit edge which are jointed at an end point of the first slit edge and the second slit edge, the first slit edge is arranged on the first side, and the second slit edge is arranged on the second side;
    a millimeter-wave antenna is arranged in the L-shaped slit, and the millimeter-wave antenna is configured to perform millimeter-wave radiation through the first slit edge and the second slit edge of the L-shaped slit; and
    a metal strip is arranged in the metal middle frame at a preset distance from the L-shaped slit, and the metal strip is perpendicular to the first slit edge and the second slit edge of the L-shaped slit; and the millimeter-wave antenna is fed with power by being coupled with the metal strip.

13. The mobile terminal of claim 12, comprising a metal back cover including the metal middle frame having a frame body, wherein
    n L-shaped slits are arranged on the frame body;

the n L-shaped slits are arranged in an array;
n is a positive integer;
the millimeter-wave antenna comprises n antenna elements corresponding to the n L-shaped slits; and
the n antenna elements are individually powered.

14. The mobile terminal of claim 13, wherein
the n L-shaped slits comprise n first slit edges and n second slit edges which are jointed at end points of the first slit edges and the second slit edges; and
the n first slit edges are arranged in parallel on the first side, and the n second slit edges are arranged in parallel on the second side.

15. The mobile terminal of claim 12, further comprising:
a third side jointed with the first side and the second side, wherein
n L-shaped slits are arranged on the frame body, n being a positive integer; and
p L-shaped slits are arranged at a joint of the first side and the second side, q L-shaped slits are arranged at a joint of the second side and the third side, and k L-shaped slits are arranged at a joint of the first side and the third side, wherein p, q and k are all positive integers, and the sum of p, q and k is n.

16. The mobile terminal of claim 12, further comprising a fourth side which is jointed with the second side but not jointed with the first side, wherein
n L-shaped slits are arranged on the frame body, n being a positive integer; and
f L-shaped slits are arranged at a joint of the first side and the second side, and g L-shaped slits are arranged at a joint of the second side and the fourth side, wherein f and g are both positive integers, and the sum of f and g is n.

17. The mobile terminal of claim 12, wherein
a feeding point is welded on the L-shaped slit and is configured to feed power to the millimeter-wave antenna.

18. The mobile terminal of claim 12, wherein
an electrical connection metal sheet is connected to the L-shaped slit, and the millimeter-wave antenna is fed with power by being in hard contact with the electrical connection metal sheet.

19. The mobile terminal of claim 12, wherein the L-shaped slit comprises at least one of:
a slot filled with an insulating material;
a hollow slot; and
a slot covered with a net structure.

20. The mobile terminal of claim 12, wherein the mobile terminal comprises the single millimeter-wave antenna structure that is configured to perform millimeter-wave radiation in a first direction corresponding to the first side, and in a second direction corresponding to the second side, thereby covering at least two directions simultaneously, and improving coverage range of the millimeter-wave antenna; and wherein the millimeter-wave antenna structure has an S-parameter value of about −14 dB at a frequency of about 28 GHz.

* * * * *